(12) United States Patent
Kong et al.

(10) Patent No.: US 9,398,587 B1
(45) Date of Patent: Jul. 19, 2016

(54) REAL-TIME SIGNAL DETECTION OVER VERY WIDE BAND IN LOW SNR ENVIRONMENTS

(71) Applicant: HRL Laboratories, LLC, Malibu, CA (US)

(72) Inventors: Cathy (Xiangming) Kong, Newbury Park, CA (US); Kang-Yu Ni, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 48 days.

(21) Appl. No.: 14/184,609

(22) Filed: Feb. 19, 2014

(51) Int. Cl.
*H04B 1/00* (2006.01)
*H04W 72/04* (2009.01)
*H04L 5/00* (2006.01)

(52) U.S. Cl.
CPC ........... *H04W 72/044* (2013.01); *H04L 5/0064* (2013.01)

(58) Field of Classification Search
CPC . H04J 11/005; H04J 11/0069; H04J 11/0093; H04J 11/0033; H04J 11/0053; H04J 11/0056; H04B 1/109; H04B 1/123; H04B 15/00; H04B 1/10; H04B 1/7097; H04B 2201/70701; H04B 2201/70702; H04B 7/024; H04B 1/7107; H04B 1/71072; H04B 1/1027; H04B 1/1036
See application file for complete search history.

(56) References Cited

U.S. PATENT DOCUMENTS

| 5,425,050 | A | 6/1995 | Schreiber et al. | |
| 5,930,310 | A * | 7/1999 | Freeman | H04B 3/30 329/318 |
| 7,773,948 | B2 | 8/2010 | Benjebbour et al. | |
| 2008/0228446 | A1* | 9/2008 | Baraniuk | G06K 9/00523 702/189 |
| 2010/0029213 | A1* | 2/2010 | Wang | H04B 1/71072 455/63.1 |
| 2010/0104042 | A1 | 4/2010 | Benjebbour et al. | |
| 2013/0128932 | A1* | 5/2013 | Huang | H04L 5/0048 375/219 |

OTHER PUBLICATIONS

U.S. Appl. No. 13/091,020, filed Apr. 20, 2011, Kong et al.
Candes, Emmanuel J. and Tao, Terence, "Near Optimal Signal Recovery From Random Projection: Universal Encoding Strategies?" IEEE Transactions on Information Theory, vol. 52, No. 12, pp. 5406-5425, (Dec. 2006).
Kong, Xiangming and Ahmed, Mohin, "Quick Signal Detection and Dynamic Resource Allocation Scheme for Ultra-wideband Radar," Proc. of SPIE vol. 8021, pp. 802111/1-802111/12, (Jun. 21, 2011).

(Continued)

*Primary Examiner* — Golam Sorowar
(74) *Attorney, Agent, or Firm* — Ladas & Parry

(57) ABSTRACT

A method of and apparatus removing of a plurality of relatively narrow banded signals in a relatively wide banded input signal. The method involves and the apparatus provides for compressively sensing one relatively narrow banded signal in the relatively wide banded input signal and removing one relatively narrow banded signal from the relatively wide banded input signal before detecting and removing another relatively narrow banded signal in the relatively wide banded input signal, the step of and apparatus for compressing sensing occurring with respect to both (i) the input signal with the previously detected narrow banded signals removed therefrom and (ii) a frequency shifted version of (i).

19 Claims, 11 Drawing Sheets

(56) References Cited

OTHER PUBLICATIONS

Tropp, J.A. and Gilbert, A.C., "Signal Recovery from Random Measurement via Orthogonal Matching Pursuit," IEEE Transaction on Information Theory, vol. 53, No. 12, pp. 4655-4666, (Dec. 2007).

Candes, E. and Tao, T., "Stable Signal Recovery from Incomplete and Inaccurate Measurements" *Communication on Pure and Applied Mathematics 59*, 1207-1223 (2006).

Kong, Xiangming, Petre, Peter, Matic, Roy, Gilbert, Anna C., and Strauss, Martin J., "An Analog-to-Information Converter for Wideband Signals Using a Time Encoding Machine," pp. 414-419; IEEE, (2011).

Mishali, Moshe and Eldar, Yonina C., "From Theory to Practice: Sub-Nyquist Sampling of Sparse Wideband Analog Signals," IEEE Journal of Selected Topics in Signal Processing, vol. 4, No. 2, pp. 375-391, (Apr. 2010).

Donoho, David L., "Compressed Sensing," IEEE Transactions on Information Theory, vol. 52, No. 4, (Apr. 2006), pp. 1289-1306.

Adamy, D., "EW101—A First Course in Electronics Warfare," Artech House, (24 pages including table of contents), (2001).

Berger, Christian R. and Moura, Jose M. F., "Noncoherent Compressive Sensing with Application to Distributed Radar," $45^{th}$ Conference on Information Sciences and Systems, 6 pages, (2011).

Candes, Emmanuel J. and Tao, Terrence, "Decoding by Linear Programming," IEEE Transactions on Information Theory, vol. 51, No. 12, pp. 4203-4215, (Dec. 2005).

Davenport, Mark A., Boufounos, Petros T., Wakin, Michael B. and Baraniuk, Richard G., "Signal Processing with Compressive Measurements," IEEE Journal of Selected Topics in Signal Processing, vol. 4, No. 2, pp. 445-460, Apr. 2010.

Davenport, Mark A., Boufounos, Petros T. and Baraniuk, Richard G., "Compressive Domain Interference Cancellation," Workshop on Signal Proc. with Adaptive Sparse Structured Representation, 8 pages, (2009).

Herman, Matthew A. and Strohmer, Thomas, "High-Resolution Radar via Compressed Sensing," IEEE Transaction on Signal Processing 57(6), pp. 2275-2284, (Jun. 2009).

Tropp, Joel A., Laska, Jason N., Duarte, Marco F., Romberg, Justin K., and Baraniuk, Richard G., "Beyond Nyquist: Efficient Sampling of Sparse Bandlimited Signals," IEEE Transactions on Information Theory, vol. 56, No. 1, pp. 520-543 (Jan. 2010).

U.S. Appl. No. 13/091,020 (unpublished; non-publication request filed), Non-Final Office Action mailed Jan. 11, 2013.

U.S. Appl. No. 13/091,020 (unpublished; non-publication request filed), Non-Final Office Action mailed Jun. 13, 2013.

U.S. Appl. No. 13/091,020 (unpublished; non-publication request filed), Non-Final Office Action mailed Nov. 7, 2013.

U.S. Appl. No. 13/091,020 (unpublished; non-publication request filed), Final Office Action mailed May 19, 2014.

U.S. Appl. No. 13/091,020 (unpublished; non-publication request filed), Final Office Action mailed Jul. 21, 2015.

* cited by examiner

REAL-TIME SIGNAL DETECTION OVER VERY WIDE BAND IN LOW SNR ENVIRONMENTS

CROSS REFERENCE TO RELATED APPLICATIONS

This invention is an improvement over the invention described in U.S. patent application Ser. No. 13/091,020, filed Apr. 20, 2011 and entitled "Adaptive Interference Removal for Compressive Signal Detection and Reconstruction in Real Time", the disclosure of which is hereby incorporated herein by reference.

STATEMENT REGARDING FEDERALLY SPONSORED RESEARCH OR DEVELOPMENT

None.

TECHNICAL FIELD

Disclosed is an improved scheme for sampling, detecting and reconstructing analog signals residing in a wide spectrum through compressive sensing in real time. By applying compressive sensing techniques, this scheme is able to detect signals quickly over a very wide bandwidth. Unlike existing compressive sensing approaches which carry out the sampling and reconstruction procedures separately, in this new scheme, the sampling process and the detection/reconstruction process closely interact with one another. In this way, this new scheme offers real-time detection and reconstruction of signals, which is not available using known compressive sensing techniques.

BACKGROUND

Since first introduced by Candes (Candes and T. Tao. Near optimal signal recovery from random projection: universal encoding strategies? *IEEE Trans. on Information Theory*, 52:5406-5425, 2006) and Donoho (D. L. Donoho. Compressed sensing. *IEEE Trans. on Information Theory*, 52:1289-1306, 2006), compressive sensing has been adopted in many applications to save sampling resources. Besides signal reconstruction, this technique has also been used in many different signal processing fields. Signal detection is also an important area for applying this technique and has shown strong advantage for detecting signals over very wide frequency band (See Xiangming Kong and Mohin Ahmed, "Quick signal detection and dynamic resource allocation scheme for ultra-wideband radar", Proc. SPIE 8021, 802111 (2011)).

A detection scheme we previously developed (see U.S. patent application Ser. No. 13/091,020 referred to above) has been shown to be able to track input signal S well when the input SNR is large and the signal dynamic range is moderate. However, when these conditions are not met, detections are missed and false alarm rate increases quickly. To overcome these shortcomings, a better detection scheme is proposed herein.

BRIEF DESCRIPTION OF THE INVENTION

In one aspect the present invention provides a method for detecting of a plurality of relatively narrowbanded signals in a relatively widebanded input signal, the method comprising:

(i) compressively sensing the strongest narrowbanded signal in said input signal and determining a center frequency of said first narrowbanded signal;

(ii) utilizing the center frequency and the bandwidth of said strongest narrowbanded signal to remove the strongest narrowbanded signal from said input signal and to produce a version of the input signal which version corresponds to said input signal without said strongest narrowbanded signal;

(iii) repeatedly compressively sensing additional narrowbanded signals in the input signal and repeatedly utilizing a center frequency and a bandwidth of each additional narrowbanded signal to remove the each additional narrowbanded signal from said input signal and thereby to produce said version of the input signal which version corresponds to said input signal less said strongest narrowbanded signal and less each additional narrowbanded signal as the additional narrowbanded signals are repeatedly compressively sensed and removed from said input signal;

(iv) assigning each compressively sensed narrowbanded signal which is removed from the input signal to a separate narrowband receiver for signal analysis; and wherein the compressive sensing which occurs for said strongest narrowbanded signal and with respect to each additional narrowbanded occurs with respect to both said input signal less all previously detected narrowbanded signals and a frequency shifted version of said input signal less all previously detected narrowbanded signals.

DETAILED DESCRIPTION

The Earlier Solution

Before discussing the improved detection scheme proposed herein, it might be useful to again consider the technology (the earlier solution) disclosed in U.S. patent application Ser. No. 13/091,020. The earlier system and the present system are designed to cover very wide bandwidth S simultaneously while sampling at below the Nyquist rate. Compressive sensing is applied to the sampling process to reach simultaneous coverage of the entire supported band. By adding an interference removal procedure in the sampling process that closely interacts with the signal detection procedure, our system becomes an adaptive sampling system.

Let W be the entire bandwidth covered by the system. This bandwidth is divided into N frequency subbands. Signals in each subband will be treated as a different signal. Hence, the input is typically composed of a mixture of multiple narrowband signals. We further assume that at most M out of N bands will be simultaneously occupied at any moment (U.S. patent application Ser. No. 13/091,020, filed Apr. 20, 2011 discusses embodiments for which this assumption does not have to be made). The input signal can be approximated (with this assumption) as $$x(t) \simeq \sum_{k=-N/2}^{N/2-1} s_k e^{-j\pi t(2k+1)W/N}. \quad \text{Eqn (1)}$$

Figure 1A:
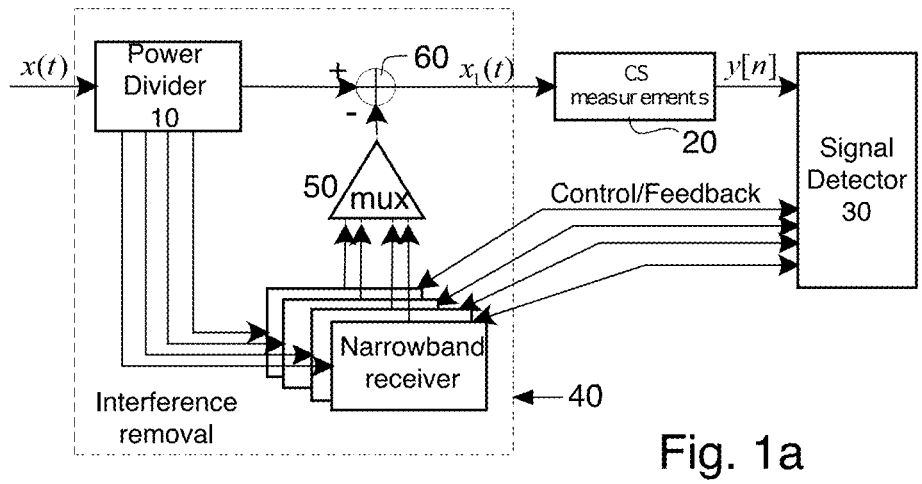
FIGS. 1*a* and 1*b* are schematic diagrams setting forth the architecture of the disclosed system having a single compressive sensing unit.
Figure 1B:
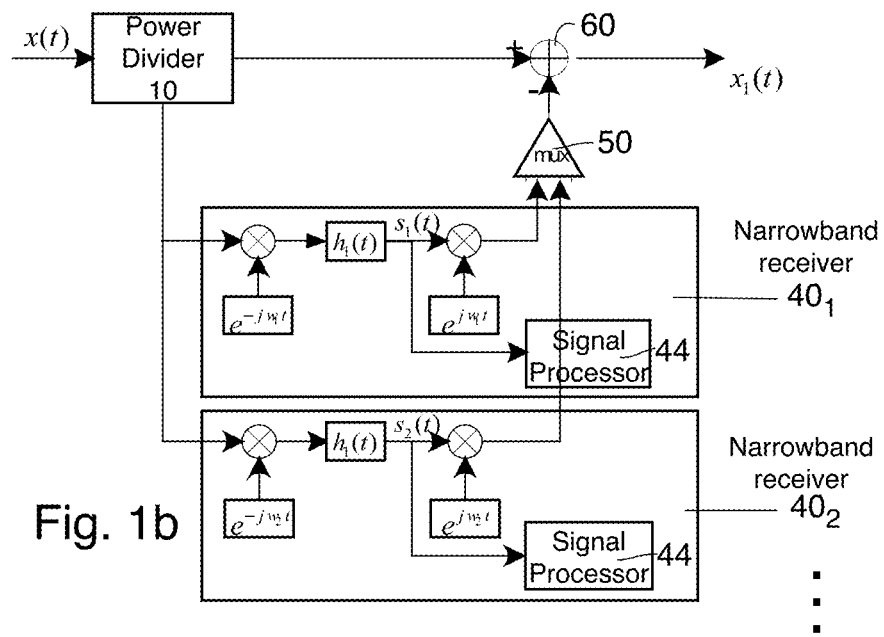

At the front end of the system, the input is divided into M+1 paths by a power divider 10 as shown by FIG. 1a. The first path is denoted as the main path $P_0$, whose major functionality is monitoring the entire spectrum and performing signal detection. In this path, measurements are taken and processed through a signal detector 30. The signal detection process follows an iterative manner Measurements are taken in rounds. In each round, a set of measurements is taken. From these measurements, preferably only one signal (the strongest) is detected during each iteration. Through each set of measurements, the signal detector 30 can quickly determine the center frequency of the strongest signal (found during a given iteration) in the input on path $P_0$ downstream of summing node 60. Then this information is sent to one of M narrowband receivers 40 which will preferably (i) analyze that signal and (2) cooperate with summing node 60 to remove that signal from path $P_0$ so that the signal detector can go on to detect the next strongest signal still coming through the summing node 60. In the narrowband receivers 40, the input is filtered to isolate this signal which is being analyzed and removed from $P_0$. Besides processing the removed signal to obtain other information about the signal, the narrowband receiver 40 also sends the isolated signal to the main path $P_0$ where it is subtracted (removed) from the input as interference by summing node 60. Then another round of measurements is taken from the "clean" input and the detection process will be repeated to detect another signal. This system architecture is shown in FIG. 1a herein and in FIG. 1b herein which respectively generally correspond to FIGS. 3a and 3b of U.S. patent application Ser. No. 13/091,020. The iterative process described about is described in even greater detail in U.S. patent application Ser. No. 13/091,020.

In detecting one (the strongest) signal in the input, the signal detector 30 processes the input (with interference removed, i.e., downstream of summing node 60) in a compressed sensing fashion using compressed sensing measurements block 20. The input in the main path with interference removed is first modulated by a pseudorandom signal p(t) which has the format $$P(t) = p_n, t \in \left[\frac{n}{W}, \frac{n+1}{W}\right] \text{ and } n = 0, 1, \ldots, N \quad \text{Eqn (2)}$$

where $p_n$ is a sequence of random numbers that takes values±1 randomly and N is an integer number, which is the number of point frequencies used to approximate the signal. The samples y[n] can be expressed in matrix format as:

$$y = HDFs \text{ where } H = \begin{bmatrix} 1 & 1 & 1 & 1 & & & & & & \\ & & & & 1 & 1 & 1 & 1 & & \\ & & & & & & & & 1 & 1 & 1 & 1 \end{bmatrix}$$

approximates the integration process, $D=\text{diag}(p_n)$ and $F=[e^{-j\pi n(2k+1)/N}]_{n,k}$ for n=0, 1, ..., N−1 and k=−N/2, −N/2+1, ..., N/2−1.

Since in each set of measurements, we only need to determine the most significant coefficient in s, we can directly apply the first step of Orthogonal Matching Pursuit (OMP) which guarantees to find the coefficients in the support of the signal if the number of nonzero coefficients in the signal satisfies the condition $$\|x_0\|_0 < \frac{1}{2}(\mu_2(\acute{A})^{-1} + 1), \quad \text{Eqn (3)}$$

where $\mu_2(\acute{A}) = \max_{i \neq j} |a_i^*, a_j|$ is the coherence of the measurement matrix. OMP is discussed in Tropp (J. A. Tropp and A. C. Gilbert, Signal Recovery from Random Measurement via Orthonal Matching Pursuit, *Information Theory, IEEE Transaction on*, vol. 53, no. 12, pp. 4655-4666, 2007).

The Improved System

Processing the samples in rounds (iteratively) as discussed above is equivalent to multiplying the signal by a square window. Although each narrowband signal only occupies one frequency subband, after windowing, the bandwidth of the narrowband signal is enlarged. Hence, when we project the signal onto the N center frequencies (of the N subbands), the coefficient for the frequencies of the subbands not occupied by the signal can also be large and resulting in a false alarm. Although increasing the window size reduces the bandwidth enlargement, as long as the window exists, the problem cannot be completely overcome.

To reduce this problem, we obtain preferably two sets of the measurements, one set being directly from the input signal (downstream of summing node 60—see FIG. 2), and the other set from the input signal frequency shifted by preferably a half bandwidth of a subband.

Figure 2:
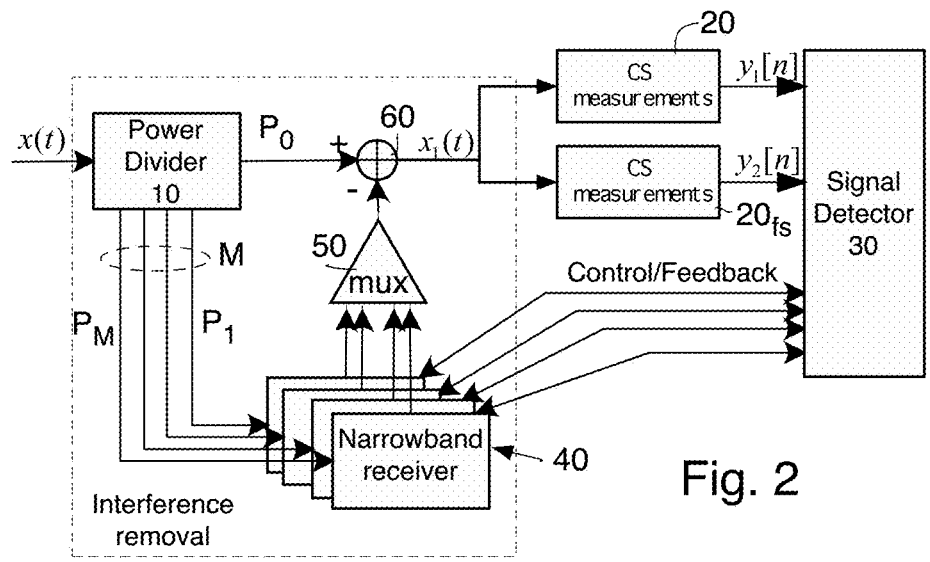
FIG. 2 is schematic diagrams setting forth the architecture of the disclosed system having two compressive sensing units.
Figure 3:
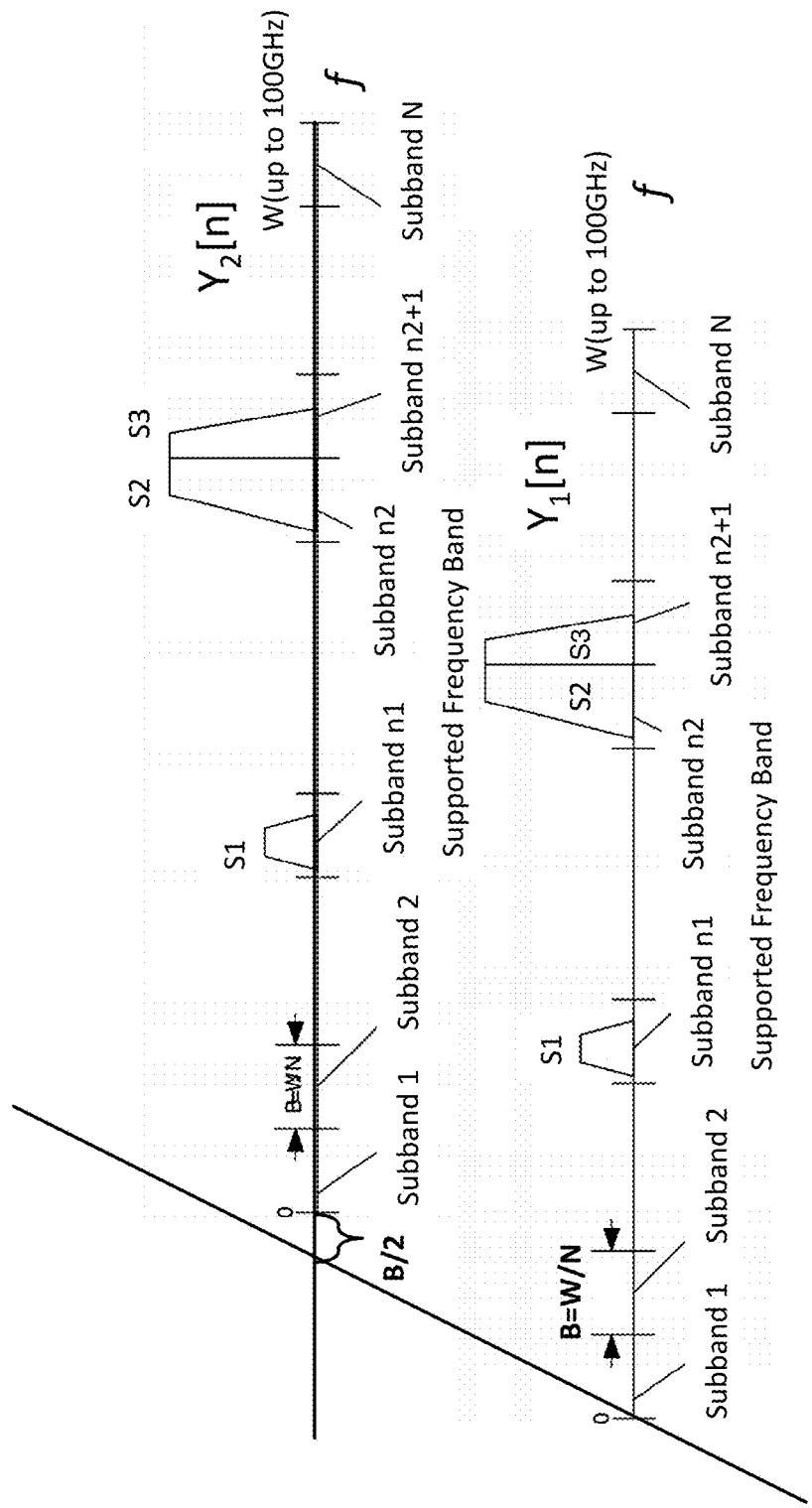
FIG. 3 shows two frequency spectrums extending from 0 (DC) to 100 GHz each with two signals in it, one frequency spectrum being shifted by preferably a half bandwidth of a subband.

Before considering FIG. 2 in greater detail, consider FIG. 3. FIG. 3 depicts two frequency spectrums extending from 0 (DC) to 100 GHz each with two signals in it, one frequency spectrum being shifted by preferably a half bandwidth of a subband (see the shift noted by B/2 in the upper most depicted spectrum) as noted above. Each frequency spectrum is divided into N subbands numbered 1 through N, each with width B=W/N. We arbitrarily and preferably assume that at most M out of N subbands will be simultaneously occupied at any given moment (this assumption reduces the amount of equipment needed to practice this invention—so the assumption need not be made by using additional equipment).

Signals in each subband will be treated as a different signal. Hence, the input signal x(t) is composed of a mixture of multiple narrowband signals. In FIG. 3 only three subbands are shown as being occupied by a signal. The signal at subbands n2 and n2+1 is wider than W/N and therefore multiple (in this case two) subbands are assigned to it and it is treated as being made up of multiple (two in this case) different signals in the frequency spectrum. The signals in subbands n, n2 and n2+1 comprise an input signal x(t) to the disclosed system. The number of subbands signals in the input signal x(t) may occupy as many as M subbands. When the shifted signal is processed, we take into consideration the half bandwidth shift, therefore, each original narrowband signal is preferably still centered at the relative axis.

In the detection process, we obtain two sets of frequency coefficients, one from each measurement set associated with each of the two frequency spectrums shown in FIG. 3. These two coefficient sets are power combined (see Eqn. (5) below). Correspondingly, the system architecture changes into the system architecture of FIG. 2 which has two compressive sensing measurement blocks 20 and $20_{fs}$. Compressive sensing measurement block $20_{fs}$ is shifted frequency-wise by one half the bandwidth of a subband (B/2 in FIG. 3). Unlike using two sets of direct measurements which may still leave large power out of the desired band whereas the in-band power is small, the frequency shift between the two sets of measurements ensures that at least one set of coefficients catch large in-band power. This is equivalent to using two point frequencies to approximate each band instead of one as with the original disclosure of U.S. patent application Ser. No. 13/091,020. In this way, the contrast between the coefficients for the occupied band and those for the empty band is increased. Hence, the system is more robust. This process can be expressed in the following equations:

$$y_1(t) = \int_0^{1/R} x(\tau)p(\tau)h(t-\tau)d\tau,$$

$$0 \le t < 1/R \Rightarrow y_1 = HD_1f_1s$$

$$y_2(t) = \int_0^{1/R} e^{-j\pi W/N} x(\tau)p(\tau)h(t-\tau)d\tau,$$

$$0 \le t < 1/R \Rightarrow y_2 = HD_2f_2s$$

Eqns (4)

$$\left.\begin{array}{l} s_{11} = F_1^H D_1^T H^T y_1 \\ s_{12} = F_2^H D_2^T H^T y_2 \end{array}\right\} \Rightarrow |s_1|^2 = |s_{11}|^2 + |s_{12}|^2$$

Eqn (5)

The cost paid to get this improvement is that we need to add one more measurement path (to accommodate $20_{fs}$), which increases the hardware complexity somewhat. Hence there is a trade-off between the detection accuracy and hardware complexity. In our simulation, we found that two branches for the main path (Po downstream of summing node 60) are good enough for SNR around 0 dB, whereas the previous approach has good performance only for SNR larger than 20 dB. Since the increase in the hardware cost is not that high, this new architecture is a better choice for low SNR applications.

Figure 2C:
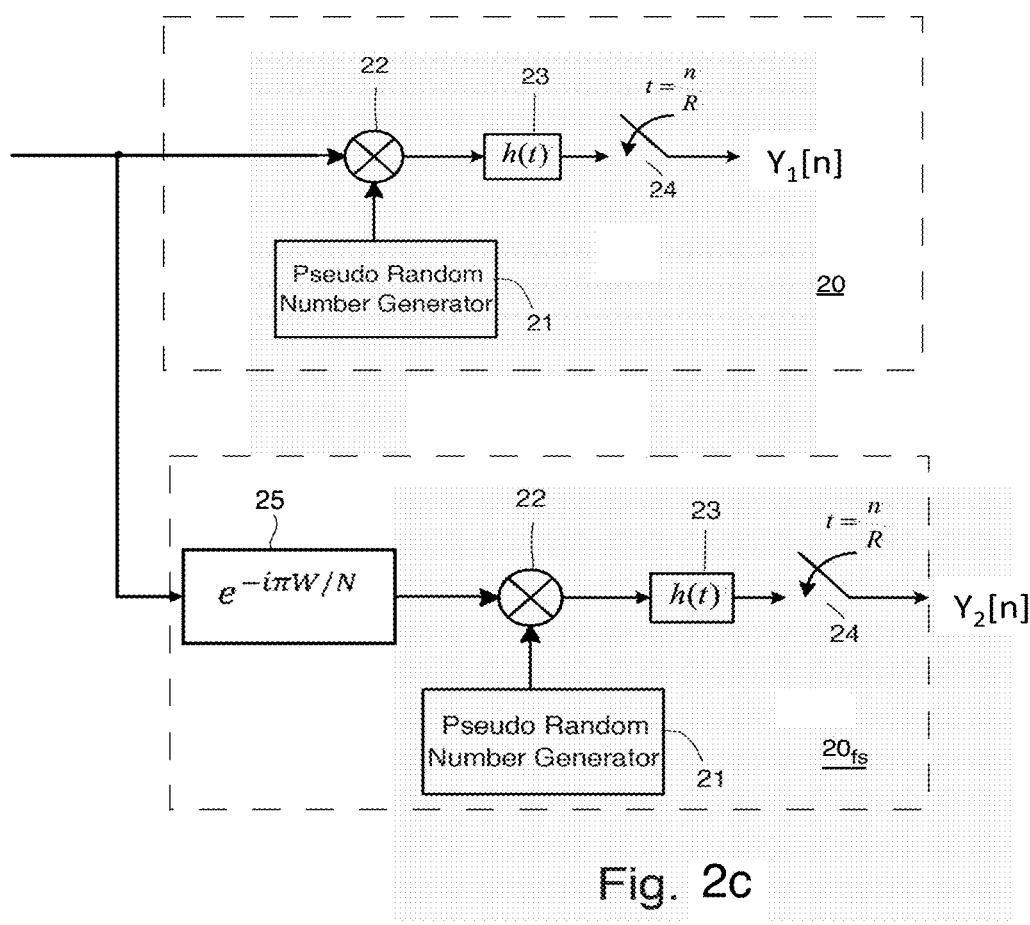
FIG. 2*c* depicts an embodiment of the compressive sensing units shown in FIG. 2.
Figure 2A:
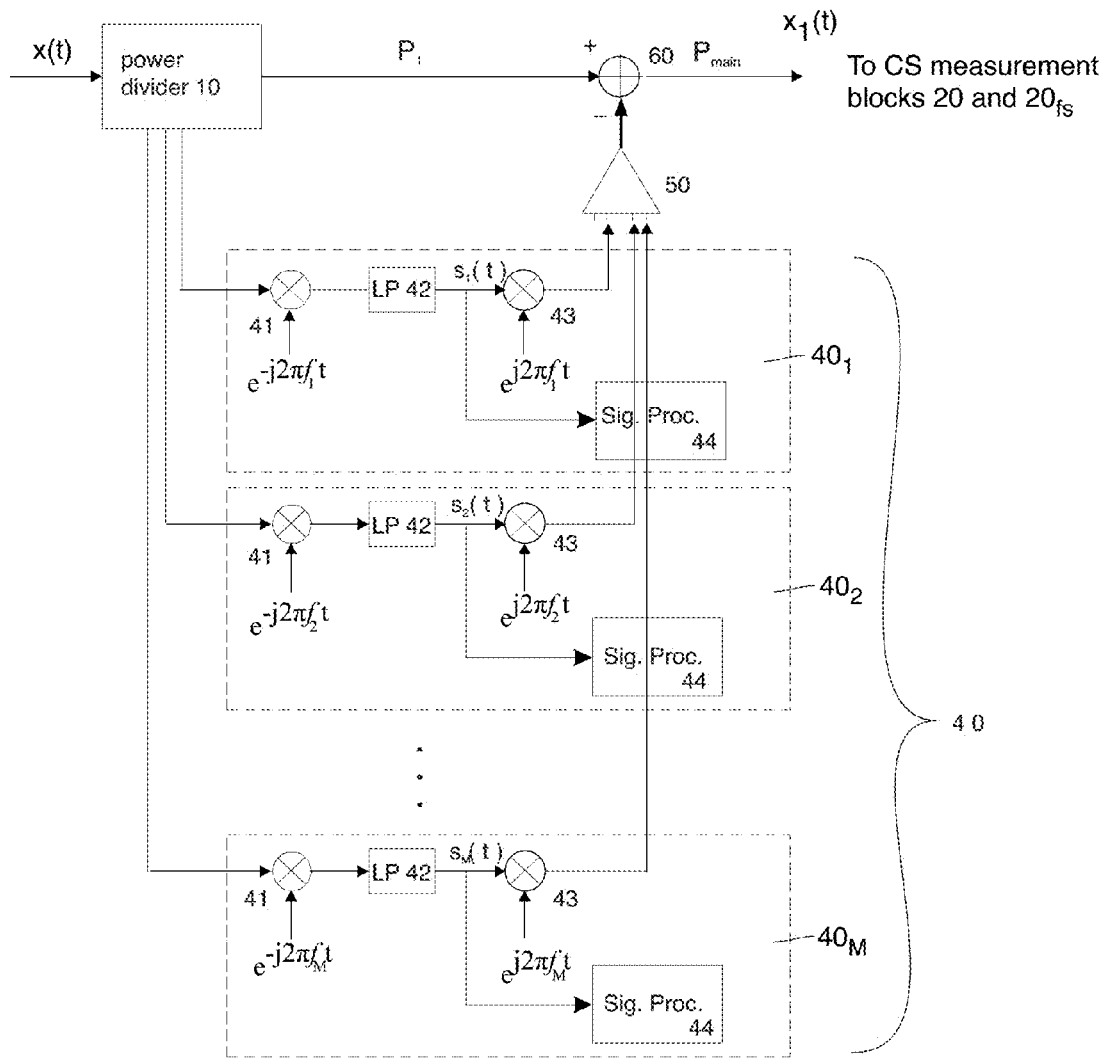
FIGS. 2*a* and 2*b* depict possible embodiment of the narrowbanded receivers shown in FIG. 1*a*.
Figure 2B:
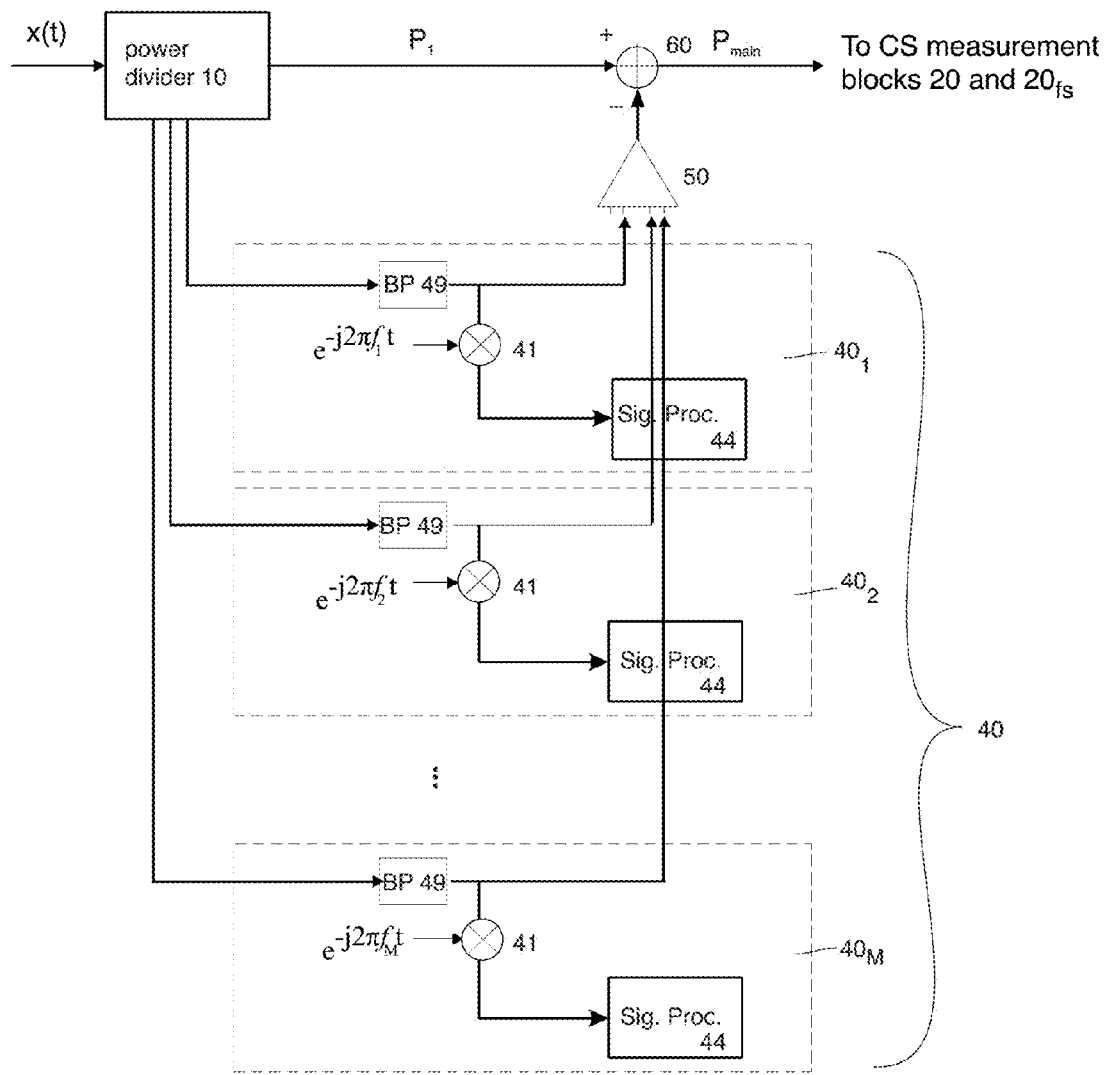

Schematic diagrams of two possible embodiments of the narrow band receivers 40 are depicted by FIGS. 2a and 2b which show two different embodiments of one of the narrowband receivers 40 in greater detail. Within a given narrowband receiver 40, the input is preferably first filtered to isolate the signal. To do this, there are two options. First, the signal can directly pass through a bandpass filter 49 to remove all other signals and noise and then be demodulated to baseband by mixing it with a carrier $e^{-j2\pi f_m t}$ (where $f_m$ is the center frequency of band m, m=1, 2, . . . N) at a mixer 41 before applying it to a signal processor 44. This embodiment is shown by FIG. 2b. However, since a receiver 40 may later be dedicated to process another signal with a different center frequency, it means the bandpass filter 49 should have an adjustable center frequency. This can be difficult to implement. Hence, a second option shown by FIG. 2a is preferably utilized. In the embodiment of FIG. 2a the input is first demodulated to baseband by mixing it with a carrier $e^{-j2\pi f_m t}$ at a first mixer 41. The demodulated signal then passes through a lowpass filter 42 to remove all other signals and noise. The bandwidth of the lowpass filter 42 should preferably be equal to the width of a subband W/N. Then the signal is then modulated back to its original passband through another mixer 43 by a carrier $e^{j2\pi f_m t}$ before being directed to summing node 60 via multiplexer 50. The advantage of this embodiment of FIG. 2a is that all narrowband receivers 40 have the same components except the center frequency of the oscillators that generate the carriers. Usually the center frequency is easy to adjust. The modulated signal output from mixer 43 is the same as that in the input to mixer 41, except that it has effectively been bandpass filtered using this technique. Hence, it is fed to the main path where it is subtracted as interference at summing node 60. Therefore, the input to the measurement block $x_1(t)$ no longer contains the isolated signal and hence it will not be detected again. This interfering signal removal technique is preferably carried out as described with reference to the embodiment of FIG. 2a.

Tuning of the narrowband receivers 40 is controlled by the carrier frequency of the two mixers 41, 43 in the narrowband receiver embodiment of FIG. 2a or the bandpass filter 49 in the embodiment of FIG. 2b. In FIGS. 2a and 2b, all the signal processors 44 handle the signal at baseband and therefore the signal processors 44 may be separate entities in each receiver 40 or a common signal processor 44 may be used for a number or all receivers 40, if desired.

Compressive sampling is now explained with reference to FIGS. 2 and 2c. The input in the main path $P_0$, occurs after summing node 60 where the output of the summing node is divided into two paths, one going to CS measurement block 20 and the other going CS measurement block $20_{fs}$. The input in the main path with interfering signals removed (at the summing node 60) is first modulated by a pseudorandom sequence p(t) in CS measurement block 20, which pseudorandom sequence has the form:

$$p(t) = p_n, t \in \left[\frac{n}{W}, \frac{n+1}{W}\right] \text{ and } n = 0, 1, \ldots, N \quad \text{(Eqn. 6)}$$

where $p_n$ is a random sequence of ±1 and N is the number of subbands. The modulated signal is lowpass filtered at block 23 and sampled by switch 24 at a rate R. This rate is lower than the Nyquist rate 2 W and was empirically chosen. The bandwidth of the lowpass filter h(t) should be roughly equal to the bandwidth of a subband. See FIG. 2c which shows a preferred embodiment of both the compressive sensing (or measurement) block 20 as well as compressive sensing (or measurement) block $20_{fs}$. Compressive sensing (or measurement) block $20_{fs}$ is identical to compressive sensing (or measurement) block 20 except that the output from the summing node 60 is frequency shifted in block 25 before being modulated at a mixer 22 by a pseudorandom sequence in block 21 as explained above.

The same (or a different) pseudorandom sequence can be used in the compressive sensing (or measurement) blocks 20 and $20_{fs}$.

In the embodiments of the compressive sensing (or measurement) blocks 20 and $20_{fs}$ the pseudorandom sequence p(t) is generated by a pseudorandom number generator 21 and modulated with the signals appearing on $P_{main}$ by the mixer 22. The output of the mixer 21 is applied to a filter 23 having a bandwidth h(t) and thence to a sampling gate or sampler 24. The outputs $y_1[n]$ and $y_2[n]$ in FIG. 2c are applied to signal detector 30 as shown in FIG. 2.

The signal detection process follows in an iterative manner. See FIG. 4a for a flow diagram of the steps SD1-SD10 which preferably occur at the signal detector 30 and FIG. 4b for the steps R1-R9 which preferably occur at a receiver 40. Measurements are taken in rounds and the detection process is preferably accomplished using a suitably programmed processor in signal detecter 30. In each round, only one signal (in a given subband) is detected by the signal detector 30, but Nc samples are taken. That is why FIG. 4a mentions that "a set of measurements are taken" at step SD1. Then the signal detector 30 reports the center frequency of the subband occupied by the detected signal by a control message to a given one of the narrowband receivers 40 of the set of receivers $\mathbf{40}_1$-$\mathbf{40}_M$ which is dedicated to isolate this signal. The narrowband receiver 40 first tests whether there is truly a signal in this subband preferably by energy detection (is the energy above some threshold (Thr). The test result is sent back to the signal detector 30 as a feedback message. If there is a signal in the subband, the narrowband receiver assigned to it would preferably process it further. Otherwise, the narrowband receiver in question would preferably wait for further control message from the signal detector. So, after the first round, receiver 401 isolates the first detected interfering signal and, after the second round, receiver $\mathbf{40}_2$ isolates the second detected interfering signal and so forth. The isolated signal(s) also occur in the main path P0 (along with all the other signals in x(t)) and they are iteratively removed by a summing node 60. In the next round of measurements, the previously detected signal is subtracted from the input as interference and a new signal will be detected. The subtraction of signals received by the narrowband receivers 40 from the signals (x(t)) on $P_0$ occurs at a subtracting input of the summing node 60 after the signals from the narrowband receivers 40 are combined by a multiplexer 50. The signal $x1(t)$, after having the signals received by the narrowband receivers 40 subtracted therefrom, occurs on path $P_{main}$. The signal on $P_{main}$ is applied to compressive sensing measurements block 20 which is described in greater detail with reference to FIG. 2c. This process continues until either all signals are removed or the system runs out of receivers 40 since the number of interfering signals must then greater than the number M of receivers 40. Each interfering signal (appearing as signals $s1(t)$-$sM(t)$) can be subjected to analysis by a signal processor 44 associated with each receiver. The signals $s1(t)$-$sM(t)$ may be digitized and applied to a digital signal processor (DSP) for such analysis and a single DSP can be used with multiple receivers 40, if desired, using well known multiplexing techniques.

Figure 4:
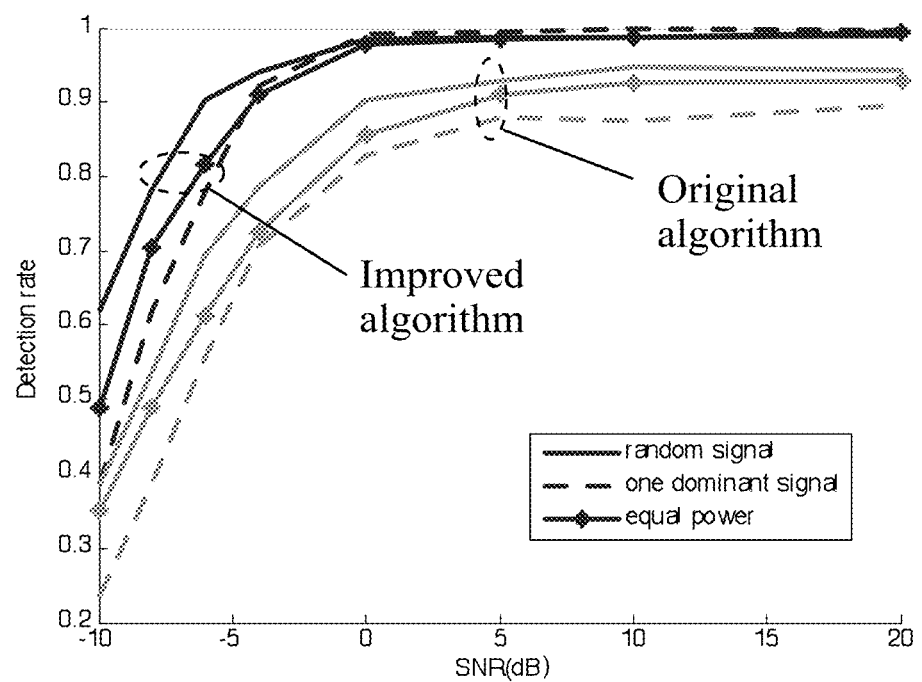
FIG. 4 shows a plot of the detection rate at different SNR based on simulation studies.
Figure 4A:
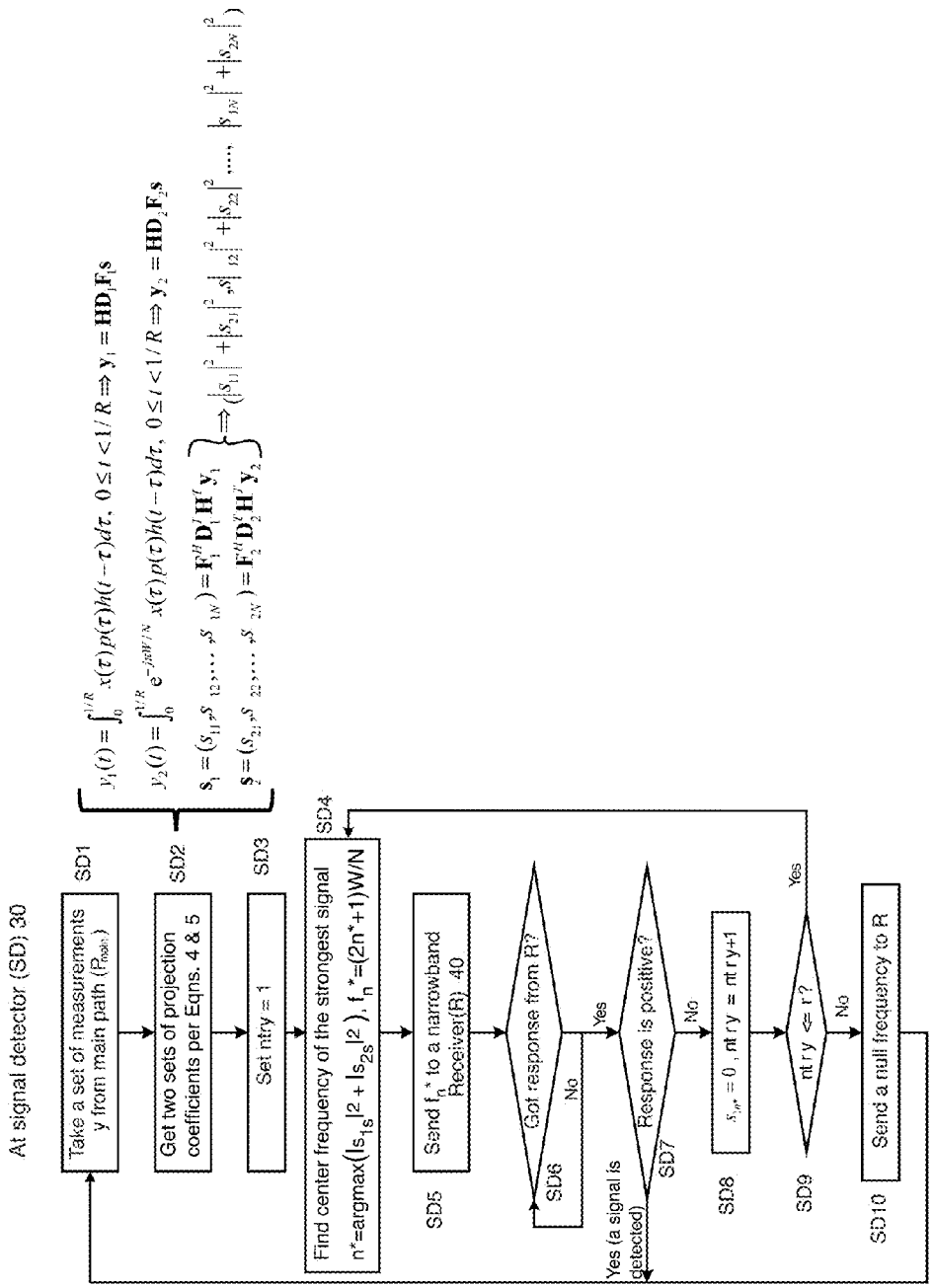
FIGS. 4*a* and 4*b* present flow diagrams of the steps which preferably occur at the signal detectors and receivers, respectively.
Figure 4B:
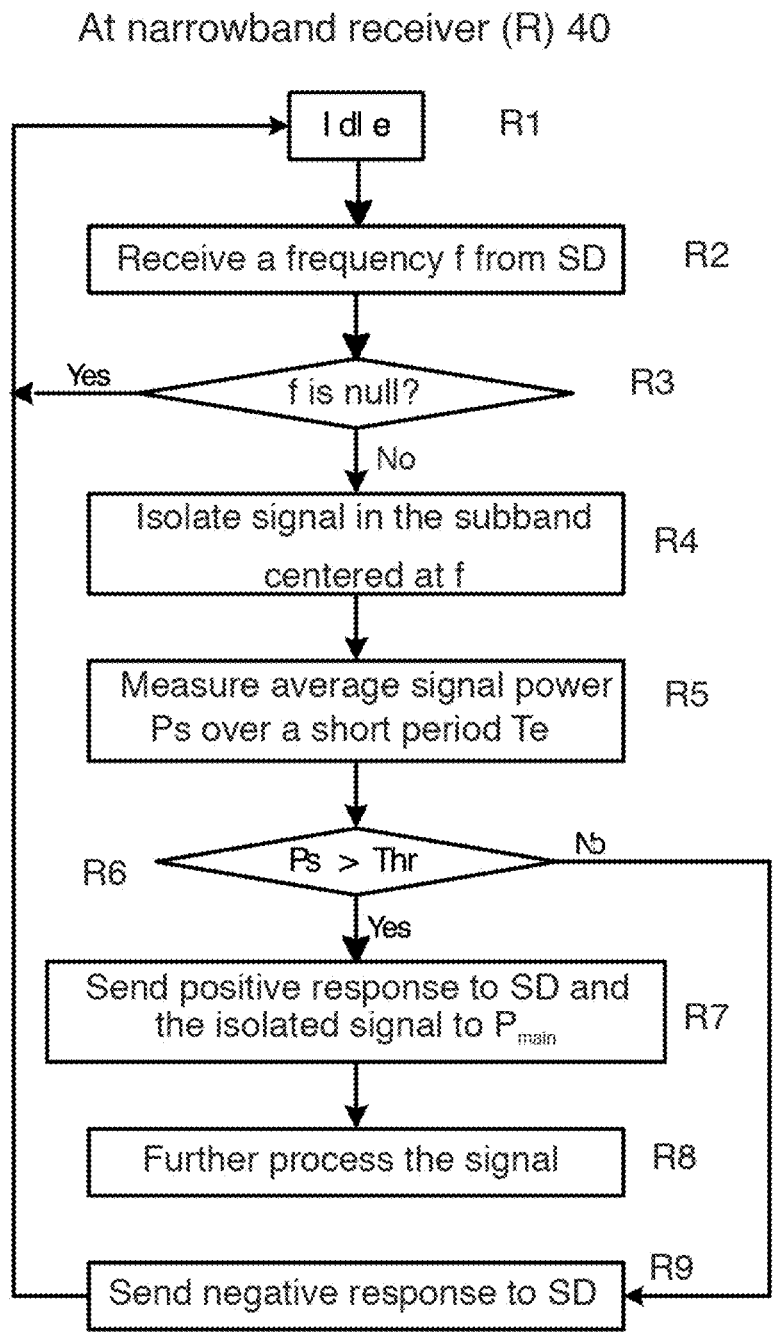
Figure 4C:
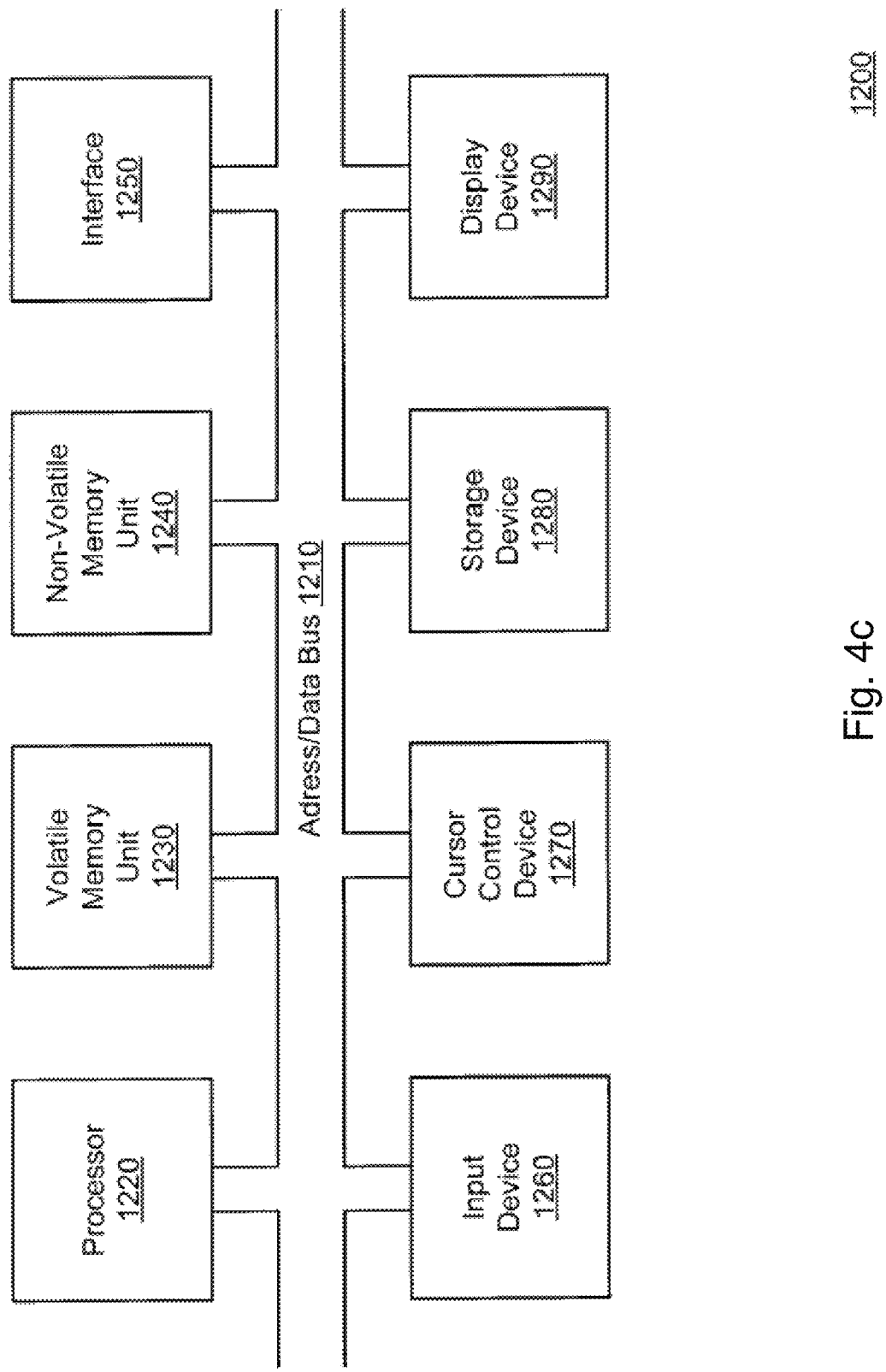
FIG. 4*c* shows a general purpose computer which may be utilized in practicing the present invention.
Figure 4D:
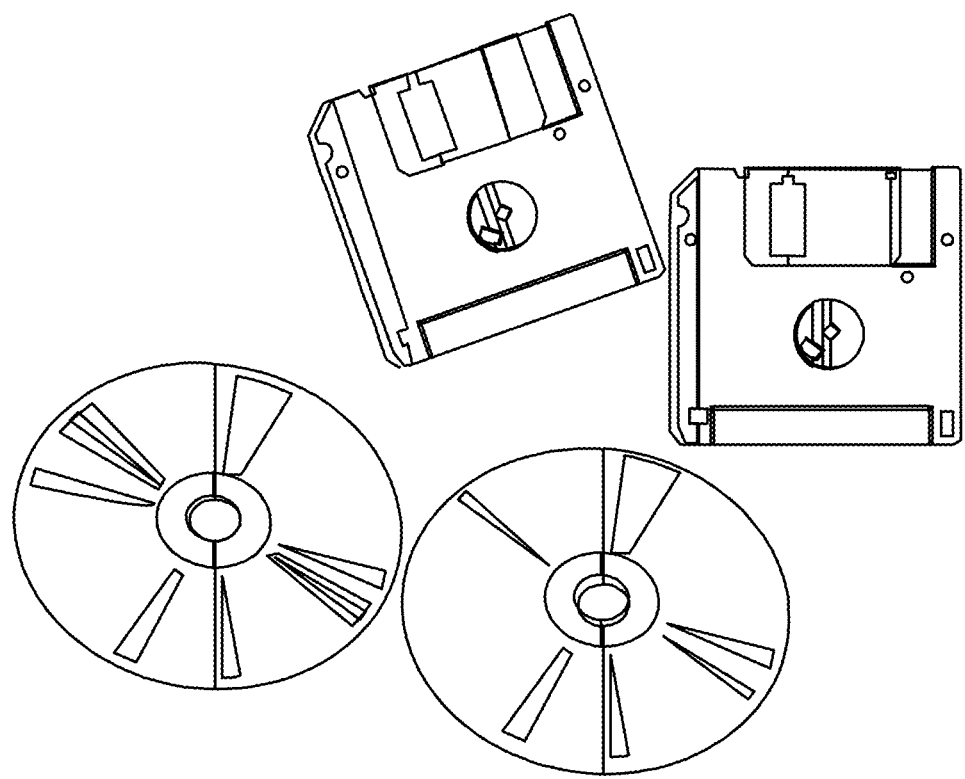
FIG. 4*d* shows two embodiments of non-volatile computer technology readable medium which may be utilized to store computer technology readable instruction means.

The flow diagram of the steps SD1-SD10 of FIG. 4a which preferably occur at the signal detector 30 are preferably implemented by software means (such as a computer program product comprising computer-readable instruction means preferably stored on a non-transitory computer-readable medium, which could be a non-volatile computer-readable medium such as that shown in FIG. 4d, that are executable by a CPU of a computer) running on a CPU in or cooperating with signal detector 30. The a flow diagram of the steps R1-R9 of FIG. 4b which preferably occur at receiver 40 are preferably implemented by software means (such as a computer program product comprising computer technology readable instruction means preferably stored on a non-volatile computer technology readable medium that are executable by a CPU of a computer) running on a CPU in or cooperating with receiver 40. So each receiver 40 preferably has a CPU 41 associated therewith and signal detector 30 likewise preferably has a CPU 31 associated therewith. The CPUs 31, 41 are preferably located in their respective receivers 40 and in the signal processor 30, although the CPUs 31, 41 could alternatively be located remotely and, moreover, a single CPU (or multiple CPUs) could control multiple receivers 40 and also the signal processor 30, if desired. The non-volatile computer technology readable medium may implemented by a hard disk or other non-volatile memory means such as flash memory or read only memory. The non-volatile computer technology readable medium may be disposed locally at the CPUs 31, 41 or remotely, if desired, The term "CPU" as used in the preceding paragraph is intended to refer, in one embodiment, to a Central Processing Unit which typically comprises the hardware within a computer that carries out the instructions of a computer program (the software means noted above) by performing the basic arithmetical, logical, and input/output operations of the computer utilizing the CPU. The CPU may be implemented as an integrated circuit which itself may comprise more than one CPU to allow the computer with which the CPU is associated to multitask. So the term "CPU" as used in the preceding paragraph is also intended to refer, in another embodiment, to a CPU in a multitasking computer where the CPU resources may be shared among the signal detectors 30 and/or the receivers 40 mentioned above. The term "CPU" as used in the preceding paragraph is intended to refer, in still yet another embodiment, to a computational system where multiple parallel processing units are used where no one of the multiple parallel processing unit is necessarily "central" to the others. The term "CPU" as used in the preceding paragraph, in still another embodiment, may be implemented as a field programmable gate array.

The term "computer" is intended to refer to the CPU and the other elements with which the CPU communicates directly, such as communication ports for transferring data for the signals detectors 30 and/or receivers 40 noted above between those elements and the CPU, as well as communication data and/or address lines connected to such communication ports and/or the computer technology readable instruction means noted above. The term computer can also refer other units traditionally associated with CPUs, such a displays, data input devices, disk drives and the like, but it is anticipated that in most embodiments such units would preferably not be employed, except perhaps during initial testing and design of the overall system disclosed herein, since the CPUs are preferably located in their respective receivers 40 and in the signal processor 30, as noted above.

A computer may be implemented as a application specific, dedicated or imbedded processor on one hand and be implemented in their respective receivers 40 and in the signal processor 30, as noted above, or it may be implemented as a more general purpose computer 1200 such as that shown in FIG. 4c on the other hand, particularly during initial design and/or testing. Some practicing the present invention may choose to use a more general purpose computer 1200 at all times and not just during initial design and/or testing. An exemplary computer system 1200 in accordance with an embodiment is shown in FIG. 4c. Exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of exemplary computer system 1200. When executed, the instructions cause exemplary computer system 1200 to perform specific actions and exhibit specific behavior, such as described herein.

Exemplary computer system 1200 may include an address/data bus 1210 that is configured to communicate information. Additionally, one or more data processing unit, such as processor 1220, are coupled with address/data bus 1210. Processor 1220 is configured to process information and instructions. In an embodiment, processor 1220 is a microprocessor. Alternatively, processor 1220 may be a different type of processor such as a parallel processor, or a field programmable gate array.

Exemplary computer system 1200 is configured to utilize one or more data storage units. Exemplary computer system 1200 may include a volatile memory unit 1230 (e.g., random access memory ("RAM"), static RAM, dynamic RAM, etc.) coupled with address/data bus 1210, wherein volatile memory unit 1230 is configured to store information and instructions for processor 1220. Exemplary computer system 1200 further may include a non-volatile memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile memory unit 1240 is configured to store static information and instructions for processor 1220. Alternatively exemplary computer system 1200 may execute instructions retrieved from an online data storage unit such as in "Cloud" computing. In an embodiment, exemplary computer system 1200 also may include one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplary computer system 1200 may include an input device 1260 coupled with address/data bus 1210, wherein input device 1260 is configured to communicate information and command selections to processor 1220. In accordance with one embodiment, input device 1260 is an alphanumeric input device, such as a keyboard, that may include alphanumeric and/or function keys. Alternatively, input device 1260 may be an input device other than an alphanumeric input device. In an embodiment, exemplar computer system 1200 may include a cursor control device 1270 coupled with address/data bus 1210, wherein cursor control device 1270 is configured to communicate user input information and/or command selections to processor 1220. In an embodiment, cursor control device 1270 is implemented using a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further may include one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented using computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 5A:
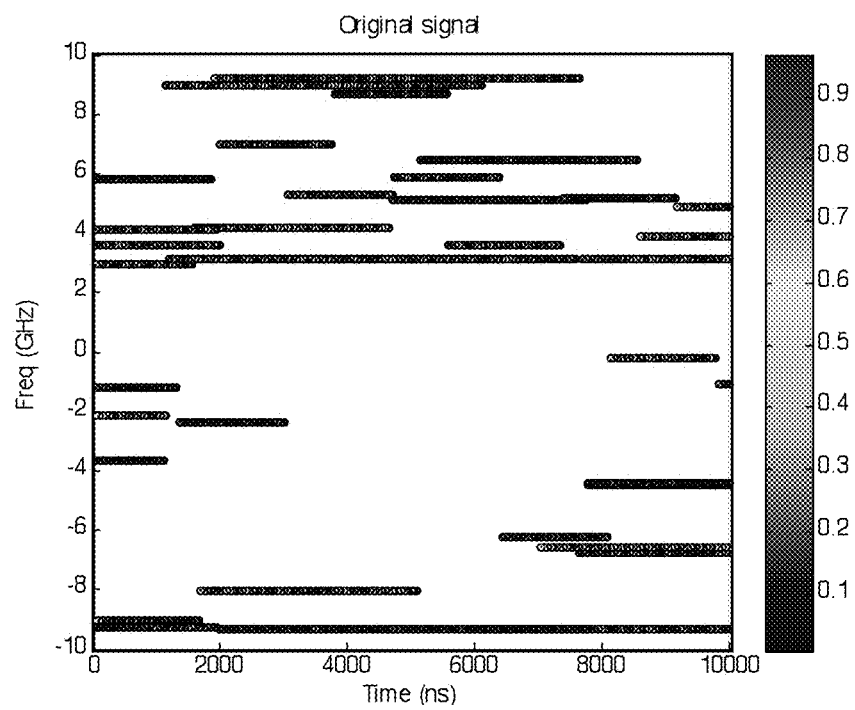
FIGS. 5*a* and 5*b* depict the results of simulations done showing the improvements provided by the new design disclosed herein.

We tested our improved system through simulation. The detection rate at different SNR values is plotted in FIG. 5a. Three different types of input are tested. Each input is made of 9 signals. In the first type of input, all 9 signals have random amplitudes. In the second type, one signal s amplitude is 10 times larger than all other signals. In the third type, all signals have equal amplitude. The result shows that the detection rate is lowest for the second type and highest for the first type. Since the noise power is determined by the entire input, in the second type of input, when the noise is strong, only one signal has relatively large SNR. Other signals are all too weak compared to the noise. Hence, we can only detect the dominant signal. While in other types of signals, multiple signals are strong enough to be detected. Hence, the detection rate would increase. In the third type of input, since all signals have equal power, the interference from band expansion is larger than other types of signals. Hence, the first type of input has the best detection rate. As a comparison, the results are also given for the system where only one set of measurements is taken (marked as original algorithm). We can see that with one extra set of measurements, the detection rate obviously improves a lot. With the new system, the detection rate is close to 100% for SNR as low as 0 dB.

Figure 5B:
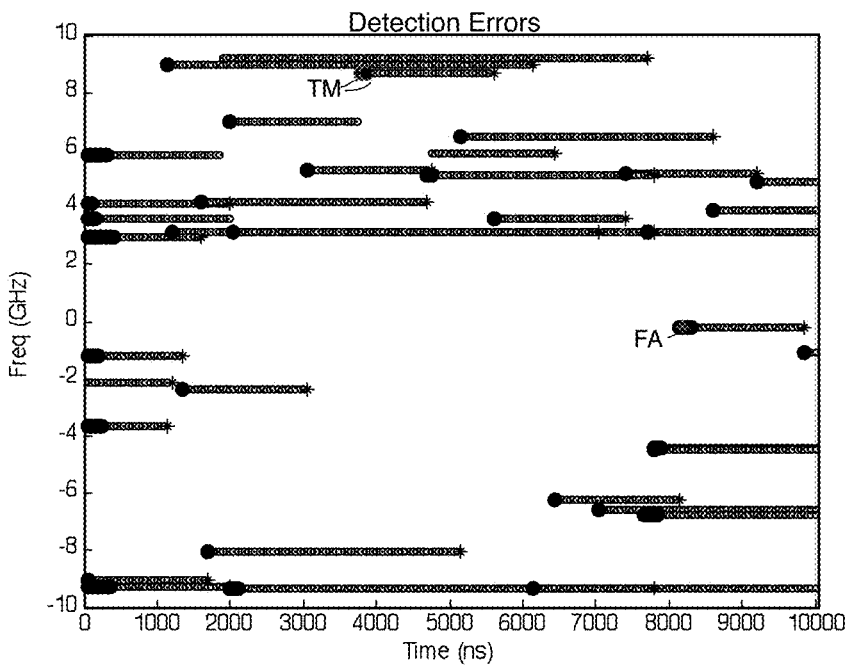

To check the system s performance on detecting and tracking frequency hopping signals, which is the main type of signal this disclosed invention intended to cover, we also simulated nine frequency hopping signals of random power. The detecting and tracking result at 20 dB SNR is given in FIG. 5b. Notice that the 20 dB SNR is calculated from entire signal power. The maximum signal dynamic range is around 35 dB. Hence, for weak signals, the individual SNR drops below −10 dB. The time-frequency distribution of the input is plotted in FIG. 5a while FIG. 5b depicts the detection result. In this plot, the gray dots represents the time-frequency of the signals correctly detected. The circles represent the time-frequency of the undetected signals. The dark circle corresponds to the signals not detected due to lack of narrowband receiver or other signals being detected in the same time slot. The two circles marked with a "TM" correspond to true misses. That is, no signal is detected in that time slot although there is at least one narrowband receiver available for processing the signal. The stars correspond to the false alarm. Dark stars are false alarms due to late detection of a signal s disappearance. The single stars marked with a "FA" is a true false alarm when the detected frequency does not correspond to any signal. From the simulation, we can see the system performs pretty well at 20 dB SNR.

It is possible that adding even more compressive sensing measurement blocks could provide additional benefits. Thus instead of adding only one compressive sensing measurement block 20f, (and shifting the input frequency by one half a subband bandwidth), two compressive sensing measurement blocks 20f, could be used instead with a first one of the two added compressive sensing measurement blocks 20fs would be shifted by ⅓ subband bandwidth and the second one of the two added compressive sensing measurement blocks 20f, would be shifted by ⅔ subband bandwidth with reference to the input frequency. So this improvement envisions adding one or more compressive sensing measurement blocks 20fi each of which would shift the input frequency by a different fraction of a subband bandwidth depending on the total number of compressive sensing measurement blocks 20 and 20fs utilized.

This concludes the description including preferred embodiments of the present invention. The foregoing description including preferred embodiments of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A method for detecting of a plurality of relatively narrowbanded signals in a relatively widebanded input signal, the method comprising:
    (i) compressively sensing a strongest narrowbanded signal in said input signal and determining a center frequency of said first narrowbanded signal;
    (ii) utilizing the center frequency and the bandwidth of said strongest narrowbanded signal to remove the strongest narrowbanded signal from said input signal and to produce a version of the input signal which version corresponds to said input signal without said strongest narrowbanded signal;
    (iii) repeatedly compressively sensing additional narrowbanded signals in the input signal and repeatedly utilizing a center frequency and a bandwidth of each additional narrowbanded signal to remove the each additional narrowbanded signal from said input signal and thereby to produce said version of the input signal which version corresponds to said input signal less said strongest narrowbanded signal and less each additional narrowbanded signal as the additional narrowbanded signals are repeatedly compressively sensed and removed from said input signal;
    (iv) assigning each compressively sensed narrowbanded signal which is removed from the input signal to a separate narrowband receiver for signal analysis; and
    wherein the compressive sensing which occurs for said strongest narrowbanded signal and with respect to each additional narrowbanded occurs with respect to both said input signal less all previously detected narrowbanded signals and a frequency shifted version of said input signal less all previously detected narrowbanded signals.

2. The method of claim 1 wherein step (iii) is repeated at least until either (1) all of the plurality of relatively narrowbanded signals have been removed from said input signal or (2) hardware resources to accomplish the removal of the relatively narrowbanded signals are exhausted.

3. The method of claim 2 wherein the step of compressively sensing includes:
    (a) mixing the input signal less all previously detected narrowbanded signals with a random sequence; and
    (b) sampling the mixed signal from step (a) at a subnyquist rate.

4. The method of claim 3 further including the step of:
    (c) projecting the sampled signal from step (b) to a space spanned by a set of sinusoid functions whereby a maximum projection coefficient is located and the frequency of the corresponding sinusoid function is determined, the frequency of the corresponding sinusoid function being the center frequency is utilized to subtract the narrowbanded signals from the input signal and to produce said cleaner version of the input signal.

5. The method of claim 3 wherein the step of compressively sensing further includes:
    (a) mixing said frequency shifted version of the input signal less all previously detected narrowbanded signals with a random sequence; and
    (b) sampling the mixed signal from step (a) at a subnyquist rate.

6. The method of claim 5 further including the step of:
    (c) projecting the sampled signal from step (b) to a space spanned by a set of sinusoid functions whereby a maximum projection coefficient is located and the frequency of the corresponding sinusoid function is determined, the frequency of the corresponding sinusoid function being the center frequency is utilized to subtract the narrowbanded signals from the input signal and to produce said cleaner version of the input signal.

7. The method of claim 1 further including testing for a continued presence of previously detected narrowbanded signals, and if one or more previously detected narrowbanded signals disappears, then hardware resource associated with subtracting those one or more previously detected narrowbanded signals are released and those signals are no longer removed from input signal to form said cleaner version thereof.

8. The method of claim 7 wherein the released hardware resources are then allocated to other detected narrowbanded signals.

9. The method of claim 1 further including, while repeatedly detecting additional narrowbanded signals, testing whether the additional narrowbanded signals exceed a predetermined energy threshold, and if they do not exceed said predetermined energy threshold, then designating them to be noise and ignoring them rather than removing them from the input signal x(t) in forming said version of the input signal.

10. A computer program product for processing a plurality of relatively narrowbanded signals in a relatively widebanded input signal data, the computer program product comprising computer technology readable instruction means stored on a non-transitory computer technology readable medium that are executable by a processor for causing the processor to perform operations of:
- (i) compressively sensing a first narrowbanded signal in said input signal data and determining a center frequency of said first narrowbanded signal;
- (ii) utilizing a center frequency and bandwidth of said first narrowbanded signal to remove the first narrowbanded signal from said input signal data and to produce a cleaner version of the input signal data which version initially corresponds to said input signal data without said first narrowbanded signal;
- (iii) repeatedly compressively sensing additional narrowbanded signals in the cleaner version of the input signal and repeatedly utilizing a center frequency and bandwidth of each additional narrowbanded signal to remove the each additional narrowbanded signal from said input signal and thereby to produce said cleaner version of the input signal data which cleaner version corresponds to said input signal data less first narrowbanded signal and less each additional narrowbanded signal as the additional narrowbanded signals are repeatedly detected and removed from said input signal data;
- wherein the compressive sensing which occurs for said first narrowbanded signal and with respect to each additional narrowbanded occurs with respect to both said input signal with all previously detected narrowbanded signals removed therefrom and a frequency shifted version of said input signal with all previously detected narrowbanded signals removed therefrom.

11. The computer program product of claim 10 wherein step (iii) is repeated according to the computer technology readable instruction means at least until either (1) all of the plurality of relatively narrowbanded signals have been removed from said input signal or (2) hardware resources to accomplish the removal of the relatively narrowbanded signals are exhausted.

12. The computer program product of claim 10 wherein the step of detecting the first and additional narrowbanded signals is performed compressively in accordance with the computer technology readable instruction means.

13. The computer program product of claim 12 wherein the step of compressively sensing includes:
- (a) mixing the input signal with all previously sensed narrowbanded signals removed therefrom with a random sequence; and
- (b) sampling the mixed signal from step (a) at a subnyquist rate.

14. The computer program product of claim 10 wherein the computer technology readable instruction means include instructions that are executable by the processor for causing the processor to perform operations of testing for a continued presence of previously detected narrowbanded signals, and if one or more previously detected narrowbanded signals disappears, then hardware resource associated with subtracting those one or more previously detected narrowbanded signals are released and those signals are no longer removed from input signal x(t) to form said cleaner version thereof.

15. The computer program product of claim 14 wherein the released hardware resources are then allocated to other detected narrowbanded signals.

16. The computer program product of claim 10 wherein the computer technology readable instruction means include instructions that are executable by the processor for causing the processor to perform operations, while repeatedly detecting additional narrowbanded signals, of testing whether the additional narrowbanded signals exceed a predetermined energy threshold, and if they do not exceed said predetermined energy threshold, then designating them to be noise and ignoring them rather than removing them from the input signal in forming said version of the input signal.

17. The computer program product of claim 13 wherein the step of compressively sensing further includes:
- (c) projecting the sampled signal from step (b) to a space spanned by a set of sinusoid functions whereby a maximum projection coefficient is located and the frequency of the corresponding sinusoid function is determined, the frequency of the corresponding sinusoid function being the center frequency is utilized to subtract the narrowbanded signals from the input signal and to produce said cleaner version of the input signal data.

18. A method for detecting a plurality of relatively narrowbanded signals in a relatively widebanded input signal x(t), the plurality of relatively narrowbanded signals having locations in said relatively widebanded input signal x(t) which are not known prior to utilizing said method, the method comprising:
- (i) detecting a first narrowbanded signal in a subband of said input signal x(t) wherein said first narrowbanded signal is more dominant than any other narrowbanded signal in any other subband of said input signal x(t) and determining a center frequency of the subband in which said first narrowbanded signal is detected, the detecting step including subjecting the first narrowbanded signal to compressive sensing in a first compressive sensing circuit and also subjecting a frequency shifted version of said first narrowbanded signal to compressive sensing in a second compressive sensing circuit;
- (ii) utilizing the center frequency and the bandwidth of said more dominant narrowbanded signal to remove the more dominant narrowbanded signal from said input signal x(t) and to produce a version of the input signal which version corresponds to said input signal without said more dominant narrowbanded signal; and
- (iii) repeatedly compressively sensing additional narrowbanded signals in the input signal and repeatedly utilizing a center frequency and a bandwidth of each additional narrowbanded signal to remove the each additional narrowbanded signal from said input signal and thereby to produce said version of the input signal which version corresponds to said input signal less said more dominant narrowbanded signal and less each additional narrowbanded signal as the additional narrowbanded signals are repeatedly compressively sensed in said first and second compressive sensing circuits and removed from said input signal.

19. An apparatus for detecting a plurality of relatively narrowbanded signals in a relatively widebanded input signal x(t), the plurality of relatively narrowbanded signals having locations in said relatively widebanded input signal x(t) which are not known prior to utilizing said method, the method comprising:
- (i) means for detecting a first narrowbanded signal in a subband of said input signal x(t) wherein said first narrowbanded signal is more dominant than any other narrowbanded signal in any other subband of said input signal x(t) and determining a center frequency of the subband in which said first narrowbanded signal is detected, the detecting means including first and second compressive sensing circuits subjecting the first narrowbanded signal to compressive sensing in the first compressive sensing circuit and also subjecting a frequency shifted version of said first narrowbanded signal to compressive sensing in the second compressive sensing circuit;

(ii) a node responsive to said input signal x(t) and to the center frequency and the bandwidth of said more dominant narrowbanded signal to remove the more dominant narrowbanded signal from said input signal x(t) thereby outputting a version of the input signal which version corresponds to said input signal without said more dominant narrowbanded signal; and (iii) means for detecting including means for repeatedly compressively sensing additional narrowbanded signals in the input signal in said first and second compressive sensing circuits and repeatedly utilizing a center frequency and a bandwidth of each additional narrowbanded signal to remove the each additional narrowbanded signal from said input signal at said node to thereby produce said version of the input signal which version corresponds to said input signal less said more dominant narrowbanded signal and less each additional narrowbanded signal as the additional narrowbanded signals are repeatedly compressively sensed in said first and second compressive sensing circuits and removed from said input signal at said node.

* * * * *